United States Patent
Nogawa et al.

(10) Patent No.: US 8,976,373 B2
(45) Date of Patent: Mar. 10, 2015

(54) IMAGE PROCESSING APPARATUS, COMPUTER-READABLE STORAGE MEDIUM STORING PROGRAM AND IMAGE PROCESSING METHOD

(75) Inventors: Hiroshi Nogawa, Tokyo (JP); Fumihito Akiyama, Kanagawa (JP); Masahiro Ozawa, Tokyo (JP); Jun Kuroki, Superior, CO (US); Takahisa Matsunaga, Tokyo (JP); Yasufumi Aoyama, Tokyo (JP); Kunikazu Satou, Tokyo (JP); Yasutaka Shimohara, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 628 days.

(21) Appl. No.: 13/154,647

(22) Filed: Jun. 7, 2011

(65) Prior Publication Data

US 2012/0026521 A1    Feb. 2, 2012

(30) Foreign Application Priority Data

Jun. 9, 2010    (JP) ................................ 2010-131624

(51) Int. Cl.
    *G06F 3/12*      (2006.01)
    *G06T 11/60*      (2006.01)
    *H04N 1/32*      (2006.01)

(52) U.S. Cl.
    CPC ............ *G06T 11/60* (2013.01); *H04N 1/32587* (2013.01); *H04N 2201/0094* (2013.01)
    USPC ........................... 358/1.13; 358/1.1; 358/1.15

(58) Field of Classification Search
    None
    See application file for complete search history.

(56) References Cited

U.S. PATENT DOCUMENTS

| | | | | |
|---|---|---|---|---|
| 6,456,390 B1 * | 9/2002 | Okubo et al. | ................ | 358/1.17 |
| 6,611,347 B1 * | 8/2003 | Okada et al. | ................ | 358/1.15 |
| 6,621,592 B1 * | 9/2003 | Takayama et al. | ........... | 358/1.16 |
| 6,967,730 B2 * | 11/2005 | Tomita | ........................ | 358/1.13 |

(Continued)

FOREIGN PATENT DOCUMENTS

| | | |
|---|---|---|
| CN | 1185607 A | 6/1998 |
| CN | 1464407 A | 12/2003 |

(Continued)

OTHER PUBLICATIONS

Office Action mailed Oct. 15, 2013 in counterpart Japanese Application No. 2010-131624.

(Continued)

*Primary Examiner* — Marcus T Riley
(74) *Attorney, Agent, or Firm* — Osha Liang LLP (57) ABSTRACT

Disclosed is an image processing apparatus includes a plurality of control sections each of which performs analysis processing of analyzing data of page description language form to generate intermediate language data and rendering processing of generating rendering data based on the intermediate language data generated by the analysis processing, the plurality of control sections capable of performing the analysis processing and the rendering processing parallelly with each other; and a storage section which stores the intermediate language data and the rendering data, and at least any one of the plurality of control sections obtains information with regard to a vacant capacity of the storage section, and at least any one of the control sections discontinues the analysis processing being performed by at least any one control section and performs the rendering processing based on the information with regard to the vacant capacity of the storage section and a predetermined set value.

15 Claims, 8 Drawing Sheets

(56) References Cited

U.S. PATENT DOCUMENTS

| | | | |
|---|---|---|---|
| 7,423,775 B2* | 9/2008 | Tomita | 358/1.15 |
| 7,548,333 B2* | 6/2009 | Tokura et al. | 358/1.15 |
| 2002/0027666 A1* | 3/2002 | Ikeda | 358/1.1 |
| 2002/0054312 A1* | 5/2002 | Tomita | 358/1.13 |
| 2010/0253972 A1* | 10/2010 | Ishikawa et al. | 358/1.15 |
| 2012/0133964 A1* | 5/2012 | Hayakawa | 358/1.13 |

FOREIGN PATENT DOCUMENTS

| | | |
|---|---|---|
| CN | 1464407 A | 12/2003 |
| CN | 101246346 A | 8/2008 |
| CN | 101246346 A | 8/2008 |
| JP | 06-284297 | 10/1994 |
| JP | 07-144444 | 6/1995 |
| JP | 2006-159738 | 6/2006 |
| JP | 2007-87137 | 4/2007 |
| JP | 2006-143067 | 6/2008 |

OTHER PUBLICATIONS

Office Action issued on Jun. 20, 2013 in counterpart Chinese Patent Application No. 201110158618.7.

Office Action in corresponding Chinese Patent Application No. 201110158618.7 dated Mar. 5, 2014, with translation (18 pages).

Espacenet Publication Abstract for CN1185607, publication date Jun. 24, 1998 (1 page).

Office Action issued in corresponding Chinese Application No. 201110158618.7 dated Oct. 31, 2014, and English translation thereof (14 pages).

* cited by examiner

|  | PROCESSING PAGE NUMBER | TOTAL DL SIZE (MB) | TOTAL PROCESSED DL SIZE (MB) |
|---|---|---|---|
| CORE A | 1 | 16 | 0 |
| CORE B | 2 | | |

025B2
IMAGE PROCESSING APPARATUS, COMPUTER-READABLE STORAGE MEDIUM STORING PROGRAM AND IMAGE PROCESSING METHOD

BACKGROUND OF THE INVENTION

1. Field of the Invention

The present invention relates to an image processing apparatus, a computer-readable storage medium storing a program and an image processing method.

2. Description of the Related Art

In recent years, a multi-core processor has been developed. The multi-core processor is composed of a plurality of arithmetic units (hereinafter referred to as cores), such as processor cores, wherein the arithmetic units are integrated in one package. The multi-core processor disperses the processing among the cores to be processed parallelly, and thereby improves the processing performance thereof. In particular, it is suggested to speedup the print processing of an image forming apparatus, such as a MFP (multi function printer) and a printer, by assigning each processing to each core to execute parallel processing by using the multi-core processor.

For example, Japanese Patent Application Laid-Open Publication No. 2007-87137 discloses an image forming apparatus which performs the parallel processing of rendering processing (rasterization processing) of generating rendering data on the basis of intermediate language data with a plurality of cores.

However, the image forming apparatus described in Japanese Patent Application Laid-Open Publication No. 2007-87137 performs the analysis processing of generating the intermediate language data with one core. Consequently, the other cores are to be in the state of waiting until the generation of the intermediate language data is completed, causing a case where the plurality of cores cannot be utilized effectively.

Accordingly, performing of the analysis processing parallelly with the plurality of cores can be considered. The analysis processing is the processing of analyzing data in the form of a page description language (hereinafter referred to as PDL) in the page unit and thereby generating intermediate language data.

When the analysis processing is performed with the plurality of cores, intermediate language data for pages according to the number of cores is generated. Consequently it is conceived that a memory capacity necessary for storing the intermediate language data becomes larger.

However, the adoption of a large-capacity memory and the expansion of a memory result in a cost increase of the image forming apparatus.

In order to supplement the memory capacity, the following method can be considered, that is, a storage device (for example, a hard disk drive) that is to use inexpensive in the cost with respect to the storage capacity thereof as compared to that of the memory, and to store the generated intermediate language data is saved in the storage device. However, the saving processing is an interrupt processing irrelevant to image formation, and causes the processing speed of the image forming apparatus to decrease. In addition, because the writing/reading speed of such a storage device is very slow comparing to that of the memory, the writing/reading of data requires great time. Hence, causing the processing speed of the image forming apparatus to decrease even more.

Therefore, it is conceived that a structure for effectively utilizing the memory is required in order to perform analysis processing parallelly with a plurality of cores without causing any cost increases and any decreases in processing speed of an image forming apparatus.

SUMMARY OF THE INVENTION

In view of the above problems, an object of the present invention is to effectively utilize a memory to parallelly perform analysis processing with a plurality of cores.

In order to realize at least one of the objects mentioned above, an image processing apparatus reflecting an aspect of the present invention is an image processing apparatus, including: a plurality of control sections each of which performs analysis processing of analyzing data of page description language form to generate intermediate language data and rendering processing of generating rendering data based on the intermediate language data generated by the analysis processing, the plurality of control sections capable of performing the analysis processing and the rendering processing parallelly with each other; and a storage section which stores the intermediate language data and the rendering data, wherein at least any one of the plurality of control sections obtains information with regard to a vacant capacity of the storage section, and at least any one of the control sections discontinues the analysis processing being performed by at least any one control section and performs the rendering processing based on the information with regard to the vacant capacity of the storage section and a predetermined set value.

Preferably, in the image processing apparatus, the data of page description language form includes data of a plurality of pages; each of the plurality of control sections performs the analysis processing of a page different from each other; at least any one of the plurality of control sections obtains page numbers of the analysis processing performed by the plurality of control sections, and one of the plurality of control section which performs the analysis processing of a page corresponding to a page other than a forefront page number among the page numbers discontinues the analysis processing and performs the rendering processing based on the information with regard to the vacant capacity of the storage section and the predetermined set value.

Preferably, in the image processing apparatus, the information with regard to the vacant capacity of the storage section includes information with regard to a storage capacity of the storage section which is used for storing the intermediate language data; and the predetermined set value indicates a threshold value of a storage capacity of the storage section which is to be assigned for storing the intermediate language data.

Preferably, in the image processing apparatus, the information with regard to the vacant capacity of the storage section includes a total value of a data capacity of entire intermediate language data generated by the analysis processing and a total value of a data capacity of entire intermediate language data is deleted after being subjected to the rendering processing; and at least any one of the plurality of control sections calculates the storage capacity of the storage section which is used for storing the intermediate language data, based on the total value of the data capacity of entire intermediate language data generated by the analysis processing and the total value of the data capacity of the entire intermediate language data that is deleted after being subjected to the rendering processing, and at least one of the plurality of control sections compares the calculated storage capacity of the storage section which is used for storing the intermediate language data to the predetermined set value.

BRIEF DESCRIPTION OF THE DRAWINGS

The present invention will fully be understood by means of the following minute description and the accompanying drawings, although these are not intended to limit the scope of the present invention, in which.

DETAILED DESCRIPTION OF THE PREFERRED EMBODIMENTS

In the following, an example of an embodiment of the present invention will be described with reference to the accompanying drawings in detail.

Figure 1:
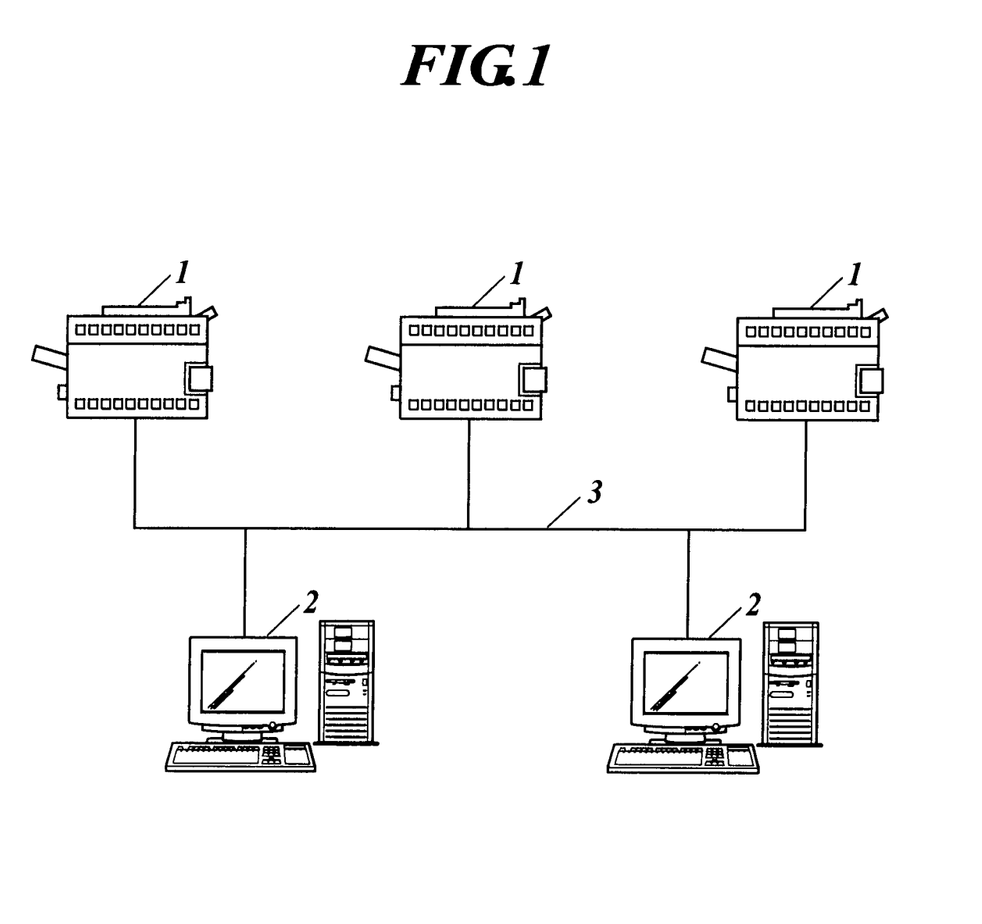
FIG. 1 is a network configuration diagram including image forming apparatuses each of which having an image processing apparatus according to the present invention.

FIG. 1 is a network configuration diagram including image forming apparatuses 1 each of which having an image processing apparatus according to the present invention.

The image forming apparatuses 1 are connected to computers 2 through a line 3 in a communicable state.

The line 3 constitutes a network including the image forming apparatuses 1 and the computers 2. The line 3 can take any form as long as the line 3 communicably connects the computers 2 and the image forming apparatuses 1. For example, the line 3 may be any one or a combination of a plurality of wired connection lines of Ethernet (registered trademark), a coaxial cable, an optical fiber, and the like, equipment based on various standards for realizing wireless communication, and the like. Moreover, the line 3 may take any network scale including those of a LAN (local area network), the Internet, and the like.

Figure 2:
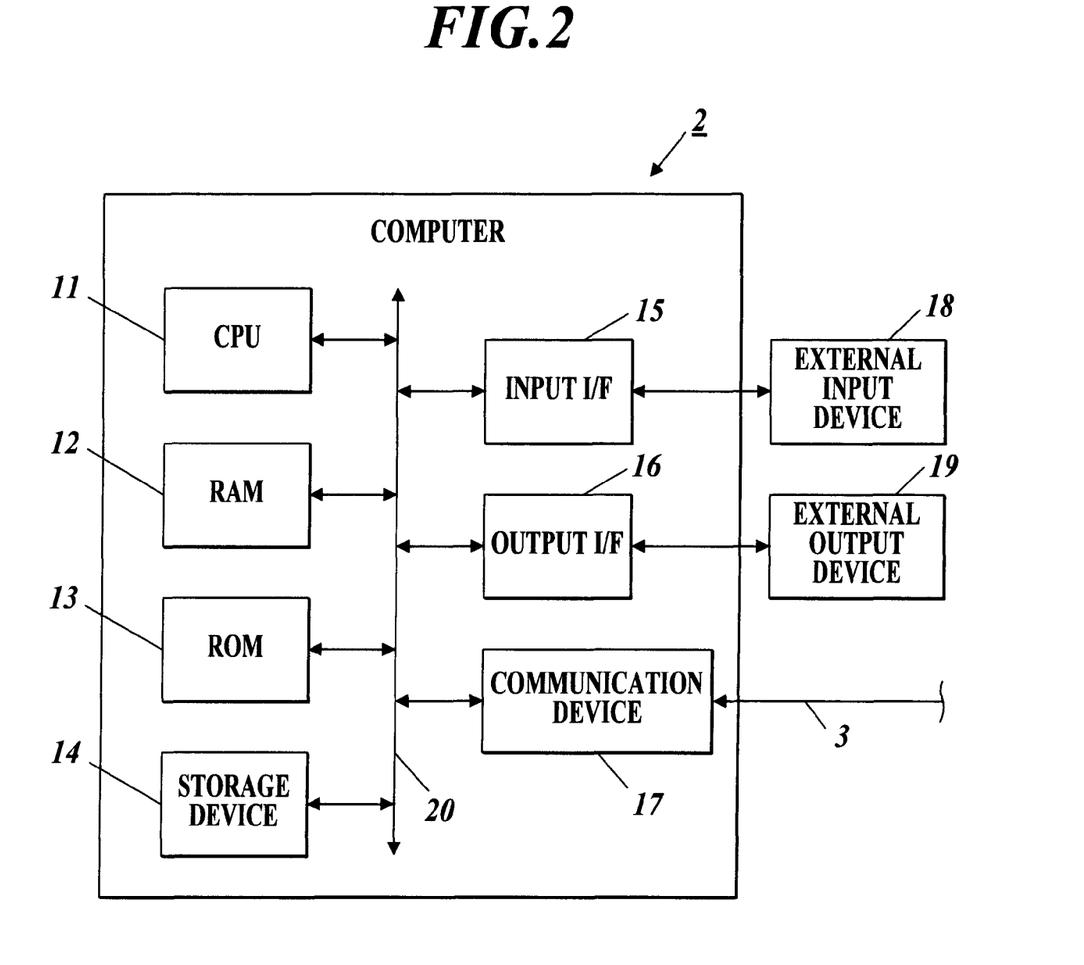
FIG. 2 is a block diagram showing the main configuration of a computer.

FIG. 2 is a block diagram showing the main configuration of each of the computers 2.

The computers 2 each includes a CPU (central processing unit) 11, a RAM (random access memory) 12, a ROM (read only memory) 13, a storage device 14, an I/F (input interface) 15, an output I/F 16 and a communication device 17, and each of these components are connected to one another through a bus 20.

The CPU 11 performs the operation control of the computers 2 in conformity with a program, data and the like expanded in the RAM 12 in cooperation with a program stored in the ROM 13.

In the RAM 12, data expanded by processing of the CPU 11 and data temporarily generated by the processing are stored.

In the ROM 13, a program, data and the like to be read out by the CPU 11 are stored.

In the storage device 14, a program, data and the like to be read out by the CPU 11 are stored. The storage device 14 is a storage device capable of rewriting a program, data and the like. The storage device 14 is composed of, for example, a flash memory, a hard disk drive, other rewritable storage devices, a combination of the above storage devices or the like.

The input I/F 15 is an interface receiving an input by an external input device 18. The external input device 18 is, for example, a keyboard, a mouse and the like, and an input instruction is carried out to the external input device 18 by a manual operation by a user.

The output I/F 16 is an interface performing an output to an external output device 19. The external output device 19 is a display device, such as a CRT (cathode ray tube), a liquid crystal display or the like, and displays an output screen based on a processing result of the CPU 11.

The communication device 17 connects the computers 2 to an external communication line (for example, the line 3) to enable communication with an external equipment. The communication device 17 is, for example, a NIC (network interface card), and a device enabling a connection according to the kind of the communication line can be used as the communication device 17.

Figure 3:
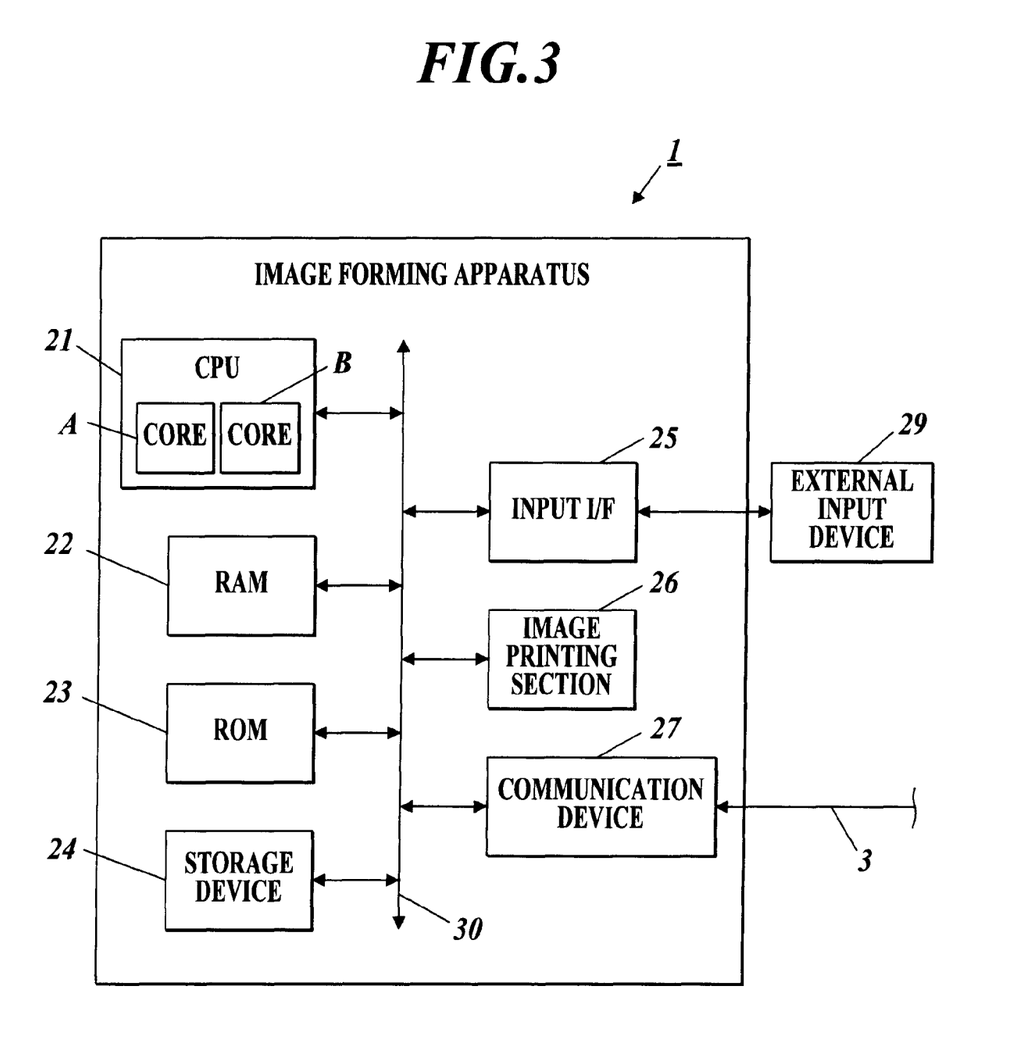
FIG. 3 is a block diagram showing the main configuration of each of the image forming apparatuses.

FIG. 3 is a block diagram showing the main configuration of each of the image forming apparatuses 1. All of the image forming apparatuses 1 shown in FIG. 1 have the same configurations, and one of the image forming apparatus 1 will accordingly be described in the following.

The image forming apparatus 1 includes a CPU 21, a RAM 22, a ROM 23, a storage device 24, an input I/F 25, an image printing section 26 and a communication device 27, and each of these components are connected to one another through a bus 30.

The CPU 21 performs the operation control of the image forming apparatus 1 in accordance with a program, data and the like expanded in the RAM 22 in cooperation with a program stored in the ROM 23. The CPU 21 includes a plurality of arithmetic units (cores). The CPU 21 of the embodiment includes two cores (core A and core B).

The RAM 22 functions as a storage section storing data expanded by processing of the CPU 11 and data temporarily generated by the processing.

The ROM 23 stores a program, data and the like to be read out by the CPU 21.

The storage device 24 stores a program, data, and the like to be read out by the CPU 21. The storage device 24 is a storage device to store a program, data and the like in a rewritable state. The storage device 24 is composed of, for example, a flash memory, a hard disk drive, other rewritable storage device, a combination of the above storage devices, or the like.

The input I/F 25 is an interface receiving an input by an input device, such as an external input device 29. The external input device 29 is, for example, an input panel having a touch panel display, and an input instruction is carried out to the external input device 29 by a manual operation by a user.

The image printing section 26 performs image formation (printing) on the basis of printing data 62, which will be described later.

For example, an electrophotographic printing system, an ink jet system, a thermal transfer system, an offset printing system and the like can be suggested as the printing systems adoptable for the image printing section 26. In the embodiment, the image printing section 26 has a configuration for performing image formation by the electrophotographic printing system.

The communication device 27 connects the image forming apparatus 1 to an external communication line (for example, the line 3) to enable communication with an external equipment. The communication device 27 is, for example, a network interface card (NIC), and a device enabling a connection according to the kind of the communication line can be used as the communication device 17.

Next, image processing by the image forming apparatus 1 will be described.

Figure 4:
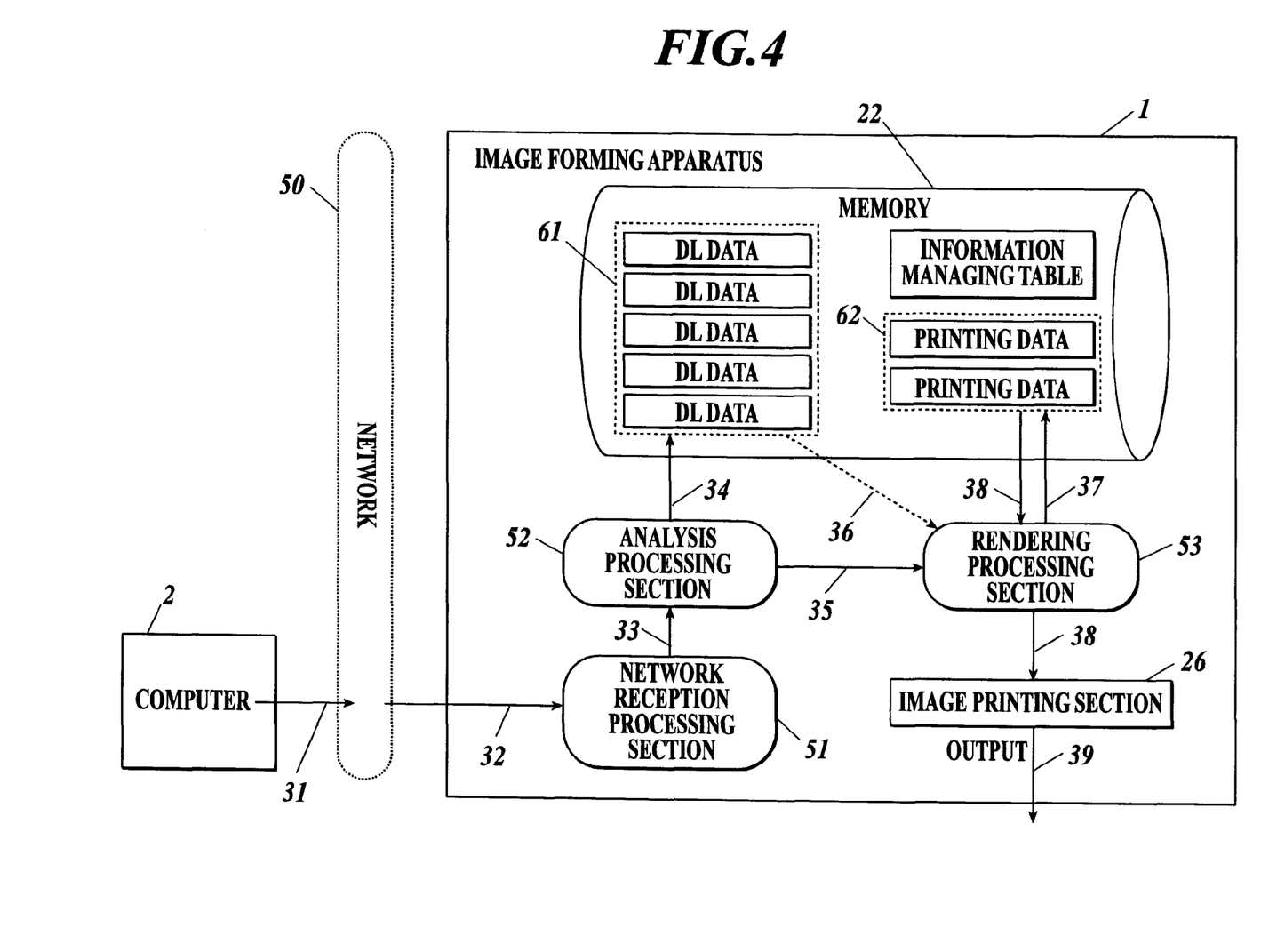
FIG. 4 is a functional block diagram showing an example of processes and functions of image processing by the image forming apparatuses.

FIG. 4 is a functional block diagram showing an example of processes and functions of image processing by the image forming apparatus 1. The CPU 21 functions as an analysis processing section 52 and a rendering processing section 53 in cooperation with programs stored in the ROM 23. First, a print job is transmitted from one of the computers 2 (as denoted by a numeral 31 in FIG. 4). The print job includes data of PDL form. The data of PDL form of a print job for printing a plurality of pages can be divided in page units.

The print job is transferred through a network 50 to be received by a network reception processing section 51 of the image forming apparatus 1 (as denoted by a numeral 32 in FIG. 4). The network 50 is build of the communication connections between the computers 2 and the image forming apparatuses 1 through the line 3. The network reception processing section 51 is a function by the communication device 27 of the image forming apparatus 1.

The print job received by the network reception processing section 51 is input into the analysis processing section 52 (as denoted by a numeral 33 in FIG. 4), and analysis processing is carried out to the print job by the analysis processing section 52. The analysis processing section 52 generates intermediate language data based on the data of PDL form. The analysis processing section 52 of the present embodiment generates display list (hereinafter referred to as DL) data 61 as the intermediate language data.

The analysis processing section 52 stores the generated DL data 61 into the RAM 22 (as denoted by a numeral 34 in FIG. 4).

When the DL data 61 corresponding to the printing content for one page is stored in the RAM 22, the image forming apparatus 1 moves on to the processing by the rendering processing section 53 from the processing by the analysis processing section 52 (as denoted by a numeral 35 in FIG. 4). Here, the printing content for one page indicates, for example, the printing content that for one sheet of paper of a predetermined size (for example, A4 size).

The rendering processing section 53 performs rendering processing (rasterization processing) (as denoted by a numeral 36 in FIG. 4) of generating rendering data based on the intermediate language data. The rendering processing section 53 of the present embodiment generates the printing data 62 as the rendering data based on the DL data 61.

The printing data 62 is bit map data for printing enabling printing output by the image printing section 26 without requiring further working and processing or is compressed bit map data generated by compressing the above bit map data. The printing data 62 is generated in band units wherein data of one page is divided into a predetermined number of bands. After completing the generation of the printing data 62 for one page, the DL data 61 corresponding to the page is deleted.

The rendering processing section 53 stores the generated printing data 62 into the RAM 22 (as denoted by a numeral 37 in FIG. 4).

The printing data 62 stored in the RAM 22 is input into the image printing section 26 (as denoted by a numeral 38 in FIG. 4), and is output for printing (as denoted by a numeral 39 in FIG. 4). When the printing output of the printing data 62 is finished, the printing data 62 corresponding to the content of the printing output is deleted from the RAM 22.

When the printing content of a print job is for a plurality of pages, the analysis processing and the processing thereafter are repeated according to the number of pages.

As described above, the CPU 21, the RAM 22 and the ROM 23 of the image forming apparatus 1 function as the image processing device in cooperation with one another.

Each of the plurality of cores included in the CPU 21 can function as the analysis processing section 52 or the rendering processing section 53. That is, it is possible to parallelly perform respective analysis processing of the plurality of cores, respective rasterization processing of the plurality of cores, or the analysis processing and the rasterization processing of the plurality of cores at the same time.

Next, management of the storage capacity of the RAM 22 associated with the analysis processing will be described.

Figure 5:
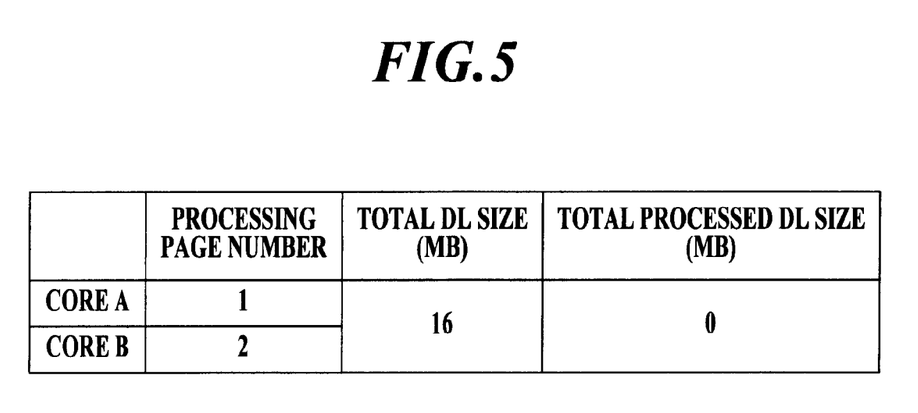
FIG. 5 is a diagram showing an example of an information managing table.

The CPU 21 generates an information managing table. The information managing table is table data for managing the page number of the page to which each of the cores performs the analysis processing and the information with regard to the vacant capacity of the RAM 22 when each of the cores functions as the analysis processing section 52.

FIG. 5 is a diagram showing an example of the information managing table.

The information managing table includes records of processing page numbers, a total DL size and a total processed DL size.

The processing page numbers indicate page numbers assigned to the cores. In the example shown in FIG. 5, the core A is assigned the analysis processing of the first page, and the core B is assigned the analysis processing of the second page.

The total DL size and the total processed DL size include information with regard to the storage capacity of the RAM 22 used for storing the DL data 61. The total DL size is the total value of the data capacity of entire DL data 61 generated based on the print job that is now being processed. The total processed DL size indicates the total value of the data capacity of entire DL data 61 to which the rasterization processing is completed. The total processed DL size indicates the total value of the data capacity of the deleted DL data 61.

In the examples shown in FIG. 5, the total DL size and the total processed DL size are managed in megabyte (MB), but the unit can suitably be changed.

Each of the cores of the CPU 21 performs the analysis processing of a page different from each other when the cores function as the analysis processing section 52. Then, each of the cores sets the page number of the page to which the core performs the analysis processing as the processing page number.

The total value of the data capacity of entire DL data 61 generated by the analysis processing performed by the cores as the cores carry out the analysis processing is set as the total DL size.

Moreover, the total value of the data capacity of entire DL data 61 to which the rasterization processing is completed as the cores carry out the rasterization processing is set as the total processed DL size.

Each of the cores A and B calculates the difference between the value of the total DL size and the value of the total processed DL size as the storage capacity (hereinafter referred to as "DL-use area size") of the RAM 22 used for storing the DL data 61.

Then, each of the cores A and B compares the calculated DL-use area size with a predetermined set value.

The predetermined set value is a value indicating a threshold value of the storage capacity in the RAM 22 that can be assigned for storing the DL data 61.

Although an arbitrary value can be used as the predetermined set value, it is desirable that the predetermined set value is equal to or less than the storage capacity of the RAM 22 and is determined based on the maximum value (maximum capacity) of the storage capacity of the DL data 61 which is the limit for not interfering with the other processing performed by the CPU 21. For example, in the embodiment, 50 MB is set as the maximum capacity in the RAM 22 that can be assigned for storing the DL data 61, and 30 MB is set as the predetermined set value.

Because the DL-use area size is a value indicating the storage capacity in the RAM 22 which is used for storing the DL data 61, the value of a DL-use area size corresponds to the size of the vacant capacity of the RAM 22. Consequently, the total DL size and the total processed DL size, which are the bases for the calculation of the DL-use area size, are the information with regard to the vacant capacity of the RAM 22.

Each of the cores performs the processing of discontinuing the analysis processing executed by each of the cores A and B itself (hereinafter referred to as "the core itself") based on a comparison result of the DL-use area size with the predetermined set value and executing rasterization processing. In the embodiment, when the DL-use area size is equal to or more than the predetermined set value, one of the cores which is performing the analysis processing of the page corresponding to the page number other than the forefront page number among the page numbers set as the processing page number discontinues the analysis processing being executed by the core itself to execute rasterization processing. In the embodiment, the core which discontinued its analysis processing performs the analysis processing of the DL data 61 corresponding to the forefront page number among the DL data 61 stored in the RAM 22.

Figure 6A:
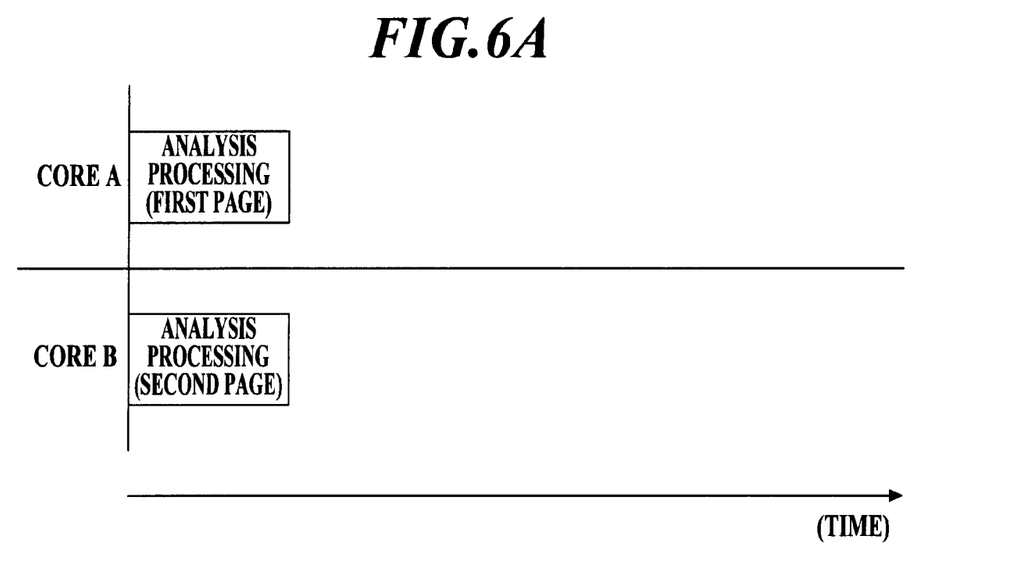
FIG. 6A is a diagram showing an example in which a core A starts the analysis processing of the first page and a core B starts the analysis processing of the second page among examples of ways in which the analysis processing is discontinued.
Figure 6B:
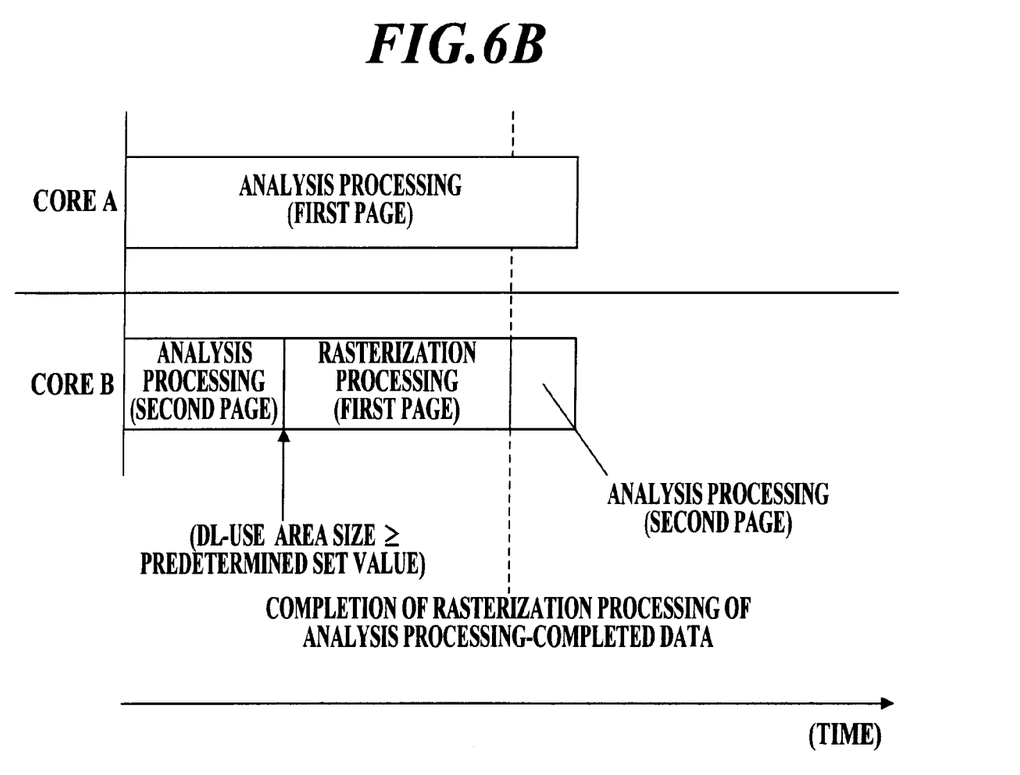
FIG. 6B is a diagram showing an example in which the core B discontinues the analysis processing thereof to perform the rasterization processing based on the DL data 61 of the first page among examples of ways in which the analysis processing is discontinued.
Figure 6C:
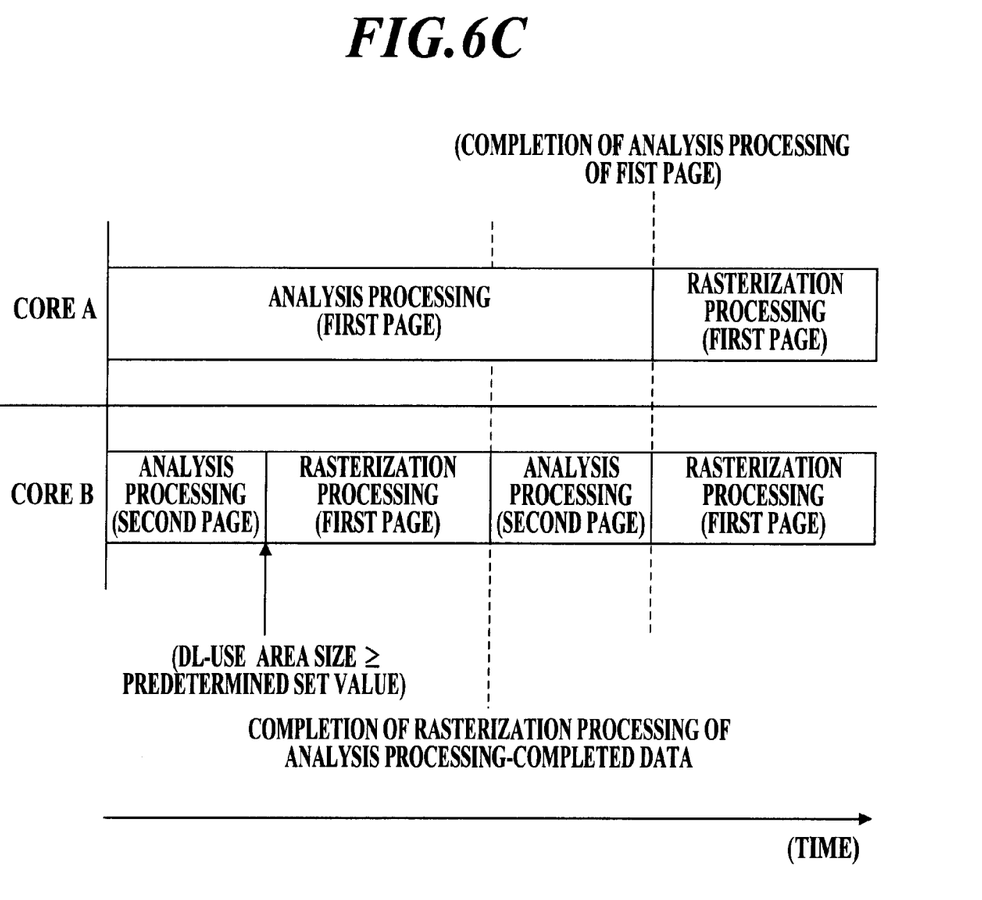
FIG. 6C is a diagram showing an example in which the core A executes the rasterization processing based on the DL data 61 of the first page parallelly to the core B among examples of ways in which the analysis processing is discontinued.

FIGS. 6A, 6B, and 6C are diagrams showing examples of progress of discontinuing the analysis processing. FIG. 6A is a diagram showing an example in which the core A starts the analysis processing of the first page and the core B starts the analysis processing of the second page. FIG. 6B is a diagram showing an example in which the core B discontinues the analysis processing thereof to perform the rasterization processing based on the DL data 61 of the first page. FIG. 6C is a diagram showing an example in which the core A executes the rasterization processing based on the DL data 61 of the first page parallelly to the rasterization processing based on the DL data 61 of the first page of the core B.

For example, as shown in FIG. 6A, the case where the core A starts the analysis processing of the first page and the core B starts the analysis processing of the second page will be described as an example. In this case, the two cores A and B exist, and the cores A and B perform the analysis processing of the first page and the second page, respectively. Consequently, the core performing the analysis processing of the page corresponding to the page number other than the forefront page number is the core B. In the information managing table, 1 is set as the processing page number of the core A, and 2 is set as the processing page number of the core B. Both of the total DL size and the total processed DL size at the starting time point are 0 MB.

The DL data 61 of the pages are respectively generated by the analysis processing parallelly performed by the cores A and B, and the generated DL data 61 are stored in the RAM 22. Although the DL data 61 are generated as data in page units, the DL data in the middle of the generation thereof is stored in the RAM 22 in real time. The data capacity of the DL data 61 generated by each of the cores A and B and stored in the RAM 22 is reflected in the total DL size of the information managing table. Because the total processed DL size is 0 MB at this point, the DL-use area size is equal to the total DL size.

When the DL-use area size is equal to or more than the predetermined set value (for example, 30 MB), the core B discontinues the analysis processing thereof and executes the rasterization processing based on the DL data 61 of the first page that is already stored in the RAM 22, as shown in FIG. 6B.

Moreover, after the completion of the rasterization processing based on the DL data 61 of the first page that is already stored in the RAM 22, the core B restarts the analysis processing, which the core B was in the middle of performing before the execution of the rasterization processing.

Thereafter, when the analysis processing of the first page by the core A is completed, the core A performs the rasterization processing based on the DL data 61 of the first page as shown in FIG. 6C. At this time, the core B parallelly executes the rasterization processing with the core A.

Thereafter, when the rasterization processing of the first page is completed, the DL data 61 of the first page is deleted, and the data capacity of the deleted DL data 61 of the first page is reflected in the total processed DL size. When the DL-use area size thereby becomes less than the predetermined set value, the core B restarts the analysis processing of the second page, which the core B was in the middle of performing. The core A starts the analysis processing of the third page, and the processing page number of the core A in the information managing table is changed to 3.

Thereafter, the judgment and the processing similar to those described above are repeated until the printing of all of the pages is completed.

Figure 7:
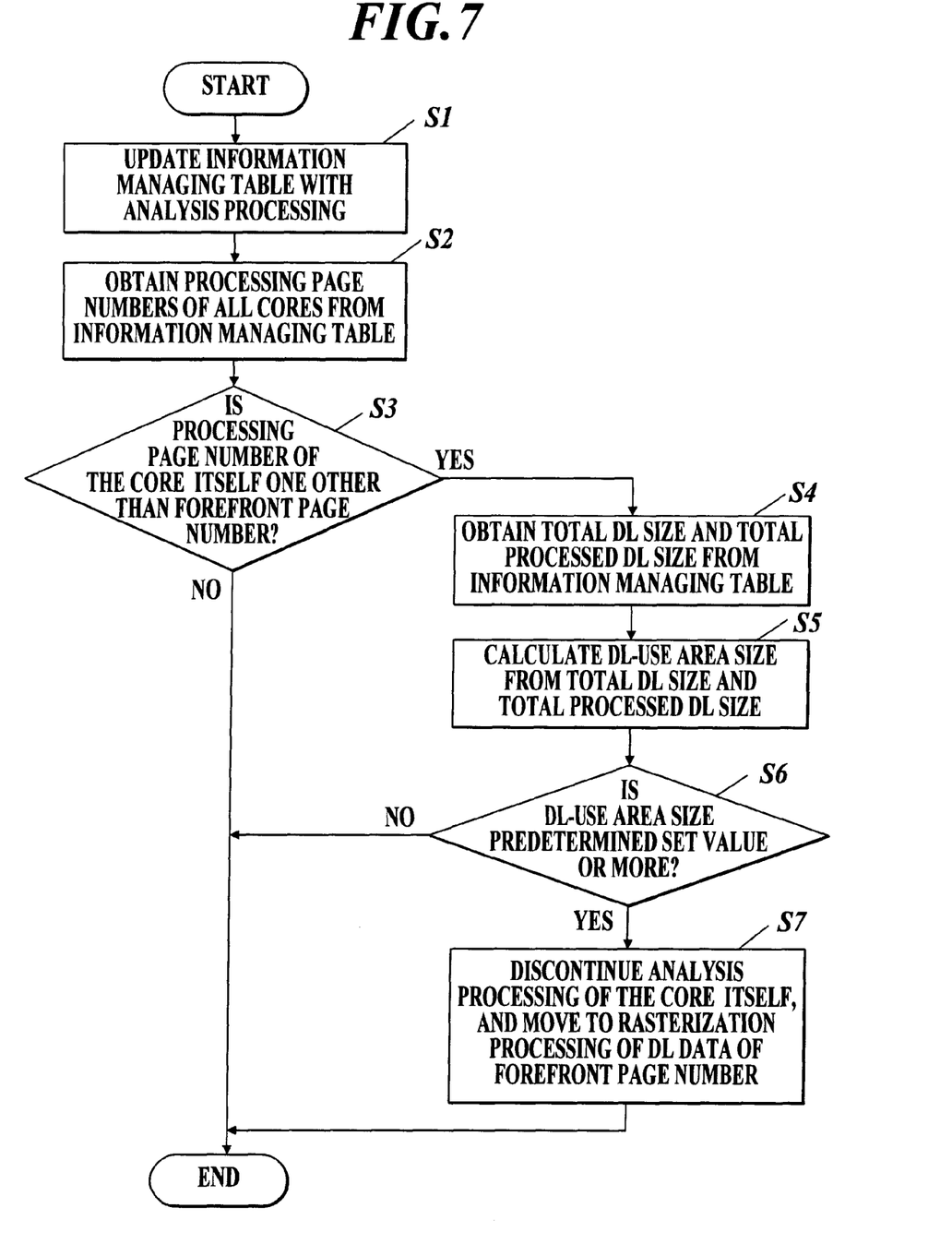
FIG. 7 is a flow chart showing a flow of discontinuance judging processing of analysis processing based on the information managing table.

The flow of discontinuance judging processing of the analysis processing based on the information managing table will be described by using the flow chart of FIG. 7.

The discontinuance judging processing is performed by each of the cores A and B of the CPU 21 during analysis processing.

Each of the cores A and B updates corresponding record in the information managing table along with the analysis processing (Step S1). Each of the cores A and B obtains all of the processing page numbers from the information managing table (Step S2). Each of the cores A and B judges whether the processing page number of the core itself among the processing page numbers obtained in Step S2 is other than the forefront page number or not (Step S3).

When a core judges that the processing page number of the core itself is other than the forefront page number in the judgment in Step S3 (Step S3: YES), the core obtains the total DL size and the total processed DL size from the information managing table (Step S4). Thereafter, the core calculates the DL-use area size from the total DL size and the total processed DL size obtained in Step S4 (Step S5). Then, the core judges whether the DL-use area size calculated at Step S5 is equal to or more than the predetermined set value or not (Step S6). When the core judges that the DL-use area size is equal to or more than the predetermined set value (Step S6: YES), the core discontinues the analysis processing of the core itself, and moves on to the rasterization processing of the DL data 61 of the page corresponding to the forefront page number among the DL data 61 stored in the RAM 22 (Step S7). Then, the core ends the discontinuance judging processing.

When a core judges that the processing page number of the core itself is the forefront page number by the judgment in Step S3 (Step S3: NO) and when the core judges that the DL-use area size is not equal to or more than the predetermined set value by the judgment in Step S6 (Step S6), then the core ends the discontinuance judging processing.

As described above, according to the embodiment, the cores A and B of the CPU 21 respectively obtain the total DL size and the total processed DL size as the information with regard to the vacant capacity of the RAM 22 to calculate the DL-use area size, and one of the cores A and B discontinues its analysis processing and executes rasterization processing based on the calculated DL-use area size and the predetermined set value.

Consequently, the degree of increase in data quantity per certain time period of the data capacity of the DL data 61 generated by the analysis processing performed by the cores A and B parallelly is reduced by discontinuing the analysis processing of one of the cores A and B. Therefore, the possibility of the vacant capacity of the RAM 22 becoming tight due to the DL data 61 generated by the analysis processing parallelly performed by the cores A and B is greatly reduced.

Furthermore, the core that discontinued its analysis processing performs rasterization processing. Hereby, the completion of the rasterization processing of the DL data 61 that is already stored in the RAM 22 can be advanced. Because the DL data 61 to which the rasterization processing is completed is to be deleted, the advancing of the completion of the rasterization processing leads to enlarging the vacant area of the RAM 22.

In such a way, one of the cores A and B discontinues its analysis processing and performs rasterization processing, and thereby the decrease speed of the vacant area of the RAM 22 accompanying the generation of the DL data 61 can be reduced and the deletion of the DL data 61 can be facilitated.

Consequently, even if the RAM 22 does not have a large capacity, a plurality of cores can parallelly start their analysis processing without causing any saving processing. That is, the analysis processing can be performed parallelly by a plurality of cores by effectively utilizing the memory.

Furthermore, each of the cores of the CPU 21 obtains the processing page numbers of all of the cores, and the core that is performing the analysis processing of the page corresponding to a page number other than the forefront page number discontinues its analysis processing and executes rasterization processing.

Hereby, the analysis processing of the core performing the analysis processing of the page corresponding to the page number other than the forefront page number is discontinued. On the other hand, the analysis processing of the core that is performing the analysis processing of the page corresponding to the forefront page number is continued. In such a way, each of the cores A and B can autonomously judge the propriety of the discontinuance of its analysis processing.

Furthermore, the predetermined set value indicates a threshold value of the storage capacity of the RAM 22 that can be assigned for storing the DL data 61. Hereby, the storage capacity of the RAM 22 which is a reference value for discontinuing analysis processing can be determined in advance.

Further, the total DL size and the total processed DL sized from which a DL-use area size can be calculated are set in the information managing table. Hereby, the judgment of whether to discontinue analysis processing of generating the DL data 61 or not can be performed on the basis of a remaining storage capacity of the DL data 61 and the predetermined set value.

Furthermore, the core that is performing the analysis processing of the page corresponding to a page number other than the forefront page number calculates a difference between the value of total DL size and the value of the total processed DL size as a DL-use area size, and compares the calculated DL-use area size and the predetermined set value.

Hereby, the judgment of whether to discontinue the analysis processing of generating the DL data 61 or not can be performed on the basis of a remaining storage capacity of the DL data 61 to the predetermined set value.

Moreover, because the calculation of the DL-use area size is performed only by the core performing the analysis processing of the page corresponding to a page number other than the forefront page number, no interrupt processing is caused in the other cores, and the more throughput of the core can be assigned to the analysis processing thereof.

Further, the embodiment of the present invention disclosed above should be considered as exemplification in all respects thereof and is not restrictive. The scope of the present invention is indicated not by the above description but by the claims, and all changes and modifications within the scope of the claims and their equivalents are intended to be included in the scope of the present invention.

In the following, examples of modifications of the present embodiment will be shown.

For example, the number of the cores is not limited to two, but may be three or more. In the information managing table, the processing page numbers according to the number of cores is being managed. For example, in the case of a CPU having three cores, when the DL-use area size becomes equal to or more than the predetermined set value, the two cores that are performing the analysis processing of the pages corresponding to page numbers other than the forefront page number among the page numbers of the pages subjected to the analysis processing by the three cores discontinue their analysis processing and perform rasterization processing.

Moreover, the present invention not only can be applied to a configuration in which one CPU includes a plurality of cores, but also can be applied to an image processing apparatus having a plurality of CPUs. Further, a part or all of the plurality of CPUs may include a plurality of cores.

It is also possible to modify to make a part of the plurality of cores, for example, a specific core, perform the judgment of the core performing the analysis processing of the page corresponding to a page number other than the forefront page number. Furthermore, it is also possible to make a part of the cores A and B judge the discontinuance of analysis processing based on the information with regard to the vacant capacity of the RAM 22 and the predetermined set value, and to make a part of the cores control the execution of discontinuing the analysis processing of the core itself or the other core performing the analysis processing to execute rasterization processing.

The information with regard to the vacant capacity of the RAM 22 is not limited to the total DL size and the total processed DL size. For example, the information with regard to the vacant capacity may be the information indicating the vacant capacity of the RAM 22 itself, or may be the information indicating the vacant capacity of the storage capacity of the RAM 22 that can be assigned for storing the DL data 61. The predetermined set value can be set suitably according to the information on the vacant capacity of the RAM 22.

These modifications can be applied in combinations thereof.

Although the above description discloses the example of using the ROM 13 as a computer-readable medium of programs according to the present invention, the computer-readable medium is not limited to that of the example. As other computer-readable media, a nonvolatile memory, such as a flash memory, and a portable recording medium, such as a compact disc read-only memory (CD-ROM), can be applied.

Moreover, as a medium for supplying data of a program according to the present invention via a communication line, a carrier wave can also be applied to the present invention.

According to an aspect of a preferable embodiment of the present invention, an image processing apparatus includes, a plurality of control sections each of which performs analysis processing of analyzing data of page description language form to generate intermediate language data and rendering processing of generating rendering data based on the intermediate language data generated by the analysis processing, the plurality of control sections capable of performing the analysis processing and the rendering processing parallelly with each other; and a storage section which stores the intermediate language data and the rendering data, and at least any one of the plurality of control sections obtains information with regard to a vacant capacity of the storage section, and at least any one of the control sections discontinues the analysis processing being performed by at least any one control section and performs the rendering processing based on the information with regard to the vacant capacity of the storage section and a predetermined set value.

According to the embodiment, the degree of increase in data quantity per certain time period of the data capacity of the DL data 61 generated by the analysis processing performed by the cores A and B parallelly is reduced by the discontinuing the analysis processing of one of the cores A and B. Therefore, the possibility of the vacant capacity of the RAM 22 becoming tight due to the DL data 61 generated by the analysis processing parallelly performed by the cores A and B is greatly reduced.

Furthermore, the core that discontinued its analysis processing performs rasterization processing. Hereby, the completion of the rasterization processing of the DL data 61 that is already stored in the RAM 22 can be advanced. Because the DL data 61 to which the rasterization processing is completed is to be deleted, the advancing of the completion of the rasterization processing leads to enlarging the vacant area of the RAM 22.

In such a way, one of the cores A and B discontinues its analysis processing and performs rasterization processing, and thereby the decrease speed of the vacant area of the RAM 22 accompanying the generation of the DL data 61 can be reduced and the deletion of the DL data 61 can be facilitated.

Consequently, even if the RAM 22 does not have a large capacity, a plurality of cores can parallelly start their analysis processing without causing any saving processing. That is, the analysis processing can be performed parallelly by a plurality of cores by effectively utilizing the memory.

According to an aspect of the preferable embodiment of the present invention, the data of page description language form includes data of a plurality of pages, each of the plurality of control sections performs the analysis processing of a page different from each other, at least any one of the plurality of control sections obtains page numbers of the analysis processing performed by the plurality of control sections, and one of the plurality of control section which performs the analysis processing of a page corresponding to a page other than a forefront page number among the page numbers discontinues the analysis processing and performs the rendering processing based do the information with regard to the vacant capacity of the storage section and the predetermined set value.

According to the embodiment, the analysis processing of the core performing the analysis processing of the page corresponding to the page number other than the forefront page number is discontinued. On the other hand, the analysis processing of the core that is performing the analysis processing of the page corresponding to the forefront page number is continued. In such a way, each of the cores A and B can autonomously judge the propriety of the discontinuance of its analysis processing.

According to an aspect of the preferable embodiment of the present invention, the information with regard to the vacant capacity of the storage section includes information with regard to a storage capacity of the storage section which is used for storing the intermediate language data, and the predetermined set value indicates a threshold value of a storage capacity of the storage section which is to be assigned for storing the intermediate language data.

According to the embodiment, the storage capacity of the RAM 22 which is a reference value for discontinuing analysis processing can be determined in advance.

Further, the judgment of whether to discontinue analysis processing of generating the DL data 61 or not can be performed on the basis of a remaining storage capacity of the DL data 61 and the predetermined set value.

According to an aspect of the preferable embodiment of the present invention, the information with regard to the vacant capacity of the storage section includes a total value of a data capacity of entire intermediate language data generated by the analysis processing and a total value of a data capacity of entire intermediate language data is deleted after being subjected to the rendering processing, and at least any one of the plurality of control sections calculates the storage capacity of the storage section which is used for storing the intermediate language data, based on the total value of the data capacity of entire intermediate language data generated by the analysis processing and the total value of the data capacity of the entire intermediate language data that is deleted after being subjected to the rendering processing, and at least one of the plurality of control sections compares the calculated storage capacity of the storage section which is used for storing the intermediate language data to the predetermined set value.

According to the embodiment, the judgment of whether to discontinue the analysis processing of generating the DL data 61 or not can be performed on the basis of a remaining storage capacity of the DL data 61 to the predetermined set value. Moreover, because the calculation of the DL-use area size is performed only by the core performing the analysis processing of the page corresponding to a page number other than the forefront page number, no interrupt processing is caused in the other cores, and the more throughput of the core can be assigned to the analysis processing thereof.

According to an aspect of the preferable embodiment of the present invention, a computer-readable storage medium storing a program for making a computer including a plurality of arithmetic units function as a plurality of control sections each of which performs analysis processing of analyzing data of page description language form to generate intermediate language data and rendering processing of generating rendering data based on the intermediate language data generated by the analysis processing, the plurality of control sections capable of performing the analysis processing and the rendering processing parallelly with each other; and a storage section which stores the intermediate language data and the rendering data, and at least any one of the plurality of control sections is made to obtain information with regard to a vacant capacity of the storage section, and at least any one of the plurality of control sections is made to discontinue the analysis processing being performed by at least any one control section and perform the rendering processing based on the information with regard to the vacant capacity of the storage section and a predetermined set value.

According to the embodiment, the degree of increase in data quantity per certain time period of the data capacity of the DL data 61 generated by the analysis processing performed by the cores A and B parallelly is reduced by the discontinuing the analysis processing of one of the cores A and B. Therefore, the possibility of the vacant capacity of the RAM 22 becoming tight due to the DL data 61 generated by the analysis processing parallelly performed by the cores A and B is greatly reduced.

Furthermore, the core that discontinued its analysis processing performs rasterization processing. Hereby, the completion of the rasterization processing of the DL data 61 that is already stored in the RAM 22 can be advanced. Because the DL data 61 to which the rasterization processing is completed is to be deleted, the advancing of the completion of the rasterization processing leads to enlarging the vacant area of the RAM 22.

In such a way, one of the cores A and B discontinues its analysis processing and performs rasterization processing, and thereby the decrease speed of the vacant area of the RAM 22 accompanying the generation of the DL data 61 can be reduced and the deletion of the DL data 61 can be facilitated.

Consequently, even if the RAM 22 does not have a large capacity, a plurality of cores can parallelly start their analysis processing without causing any saving processing. That is, the analysis processing can be performed parallelly by a plurality of cores by effectively utilizing the memory.

According to an aspect of the preferable embodiment of the present invention, the data of page description language form includes data of a plurality of pages, each of the plurality of control sections performs the analysis processing of a page different from each other, at least any one of the plurality of control sections obtains page numbers of the analysis processing performed by the plurality of control sections, and one of the plurality of control section which performs the analysis processing of a page corresponding to a page other than a forefront page number among the page numbers discontinues the analysis processing and performs the rendering processing based on the information with regard to the vacant capacity of the storage section and the predetermined set value.

According to the embodiment, the analysis processing of the core performing the analysis processing of the page corresponding to the page number other than the forefront page number is discontinued. On the other hand, the analysis processing of the core that is performing the analysis processing of the page corresponding to the forefront page number is continued. In such a way, each of the cores A and B can autonomously judge the propriety of the discontinuance of its analysis processing.

According to an aspect of the preferable embodiment of the present invention, the information with regard to the vacant capacity of the storage section includes information with regard to a storage capacity of the storage section which is used for storing the intermediate language data, and the predetermined set value indicates a threshold value of a storage capacity of the storage section which is to be assigned for storing the intermediate language data.

According to the embodiment, the storage capacity of the RAM 22 which is a reference value for discontinuing analysis processing can be determined in advance.

Further, the judgment of whether to discontinue analysis processing of generating the DL data 61 or not can be performed on the basis of a remaining storage capacity of the DL data 61 and the predetermined set value.

According to an aspect of the preferable embodiment of the present invention, the information with regard to the vacant capacity of the storage section includes a total value of a data capacity of entire intermediate language data generated by the analysis processing and a total value of a data capacity of entire intermediate language data is deleted after being subjected to the rendering processing, and at least any one of the plurality of control sections calculates the storage capacity of the storage section which is used for storing the intermediate language data, based on the total value of the data capacity of entire intermediate language data generated by the analysis processing and the total value of the data capacity of the entire intermediate language data that is deleted after being subjected to the rendering processing, and at least one of the plurality of control sections compares the calculated storage capacity of the storage section which is used for storing the intermediate language data to the predetermined set value.

According to the embodiment, the judgment of whether to discontinue the analysis processing of generating the DL data 61 or not can be performed on the basis of a remaining storage capacity of the DL data 61 to the predetermined set value. Moreover, because the calculation of the DL-use area size is performed only by the core performing the analysis processing of the page corresponding to a page number other than the forefront page number, no interrupt processing is caused in the other cores, and the more throughput of the core can be assigned to the analysis processing thereof.

According to an aspect of the preferable embodiment of the present invention, performing analysis processing of analyzing data of page description language form to generate intermediate language data and rendering processing of generating rendering data based on the intermediate language data generated by the analysis processing by each of a plurality of control sections, the plurality of control sections capable of performing the analysis processing and the rendering processing parallelly with each other, storing the intermediate language data and the rendering data, obtaining information with regard to a vacant capacity of the storage section by at least any one of the plurality of control sections, discontinuing the analysis processing being performed by the at least any one control section by at least any one of the plurality of control sections, and performing the rendering processing based on the information with regard to the vacant capacity of the storage section and a predetermined set value by at least any one of the plurality of control sections.

According to the embodiment, the degree of increase in data quantity per certain time period of the data capacity of the DL data 61 generated by the analysis processing performed by the cores A and B parallelly is reduced by the discontinuing the analysis processing of one of the cores A and B. Therefore, the possibility of the vacant capacity of the RAM 22 becoming tight due to the DL data 61 generated by the analysis processing parallelly performed by the cores A and B is greatly reduced.

Furthermore, the core that discontinued its analysis processing performs rasterization processing. Hereby, the completion of the rasterization processing of the DL data 61 that is already stored in the RAM 22 can be advanced. Because the DL data 61 to which the rasterization processing is completed is to be deleted, the advancing of the completion of the rasterization processing leads to enlarging the vacant area of the RAM 22.

In such a way, one of the cores A and B discontinues its analysis processing and performs rasterization processing, and thereby the decrease speed of the vacant area of the RAM 22 accompanying the generation of the DL data 61 can be reduced and the deletion of the DL data 61 can be facilitated.

Consequently, even if the RAM 22 does not have a large capacity, a plurality of cores can parallelly start their analysis processing without causing any saving processing. That is, the analysis processing can be performed parallelly by a plurality of cores by effectively utilizing the memory.

According to an aspect of the preferable embodiment of the present invention, the data of page description language form includes data of a plurality of pages, each of the plurality of control sections performs the analysis processing of a page different from each other, at least any one of the plurality of control sections obtains page numbers of the analysis processing performed by the plurality of control sections, and one of the plurality of control section which performs the analysis processing of a page corresponding to a page other than a forefront page number among the page numbers discontinues the analysis processing and performs the rendering processing based on the information with regard to the vacant capacity of the storage section and the predetermined set value.

According to the embodiment, the analysis processing of the core performing the analysis processing of the page corresponding to the page number other than the forefront page number is discontinued. On the other hand, the analysis processing of the core that is performing the analysis processing of the page corresponding to the forefront page number is continued. In such a way, each of the cores A and B can autonomously judge the propriety of the discontinuance of its analysis processing.

According to an aspect of the preferable embodiment of the present invention, the information with regard to the vacant capacity of the storage section includes information with regard to a storage capacity of the storage section which is used for storing the intermediate language data, and the predetermined set value indicates a threshold value of a storage capacity of the storage section which is to be assigned for storing the intermediate language data.

According to the embodiment, the storage capacity of the RAM 22 which is a reference value for discontinuing analysis processing can be determined in advance.

Further, the judgment of whether to discontinue analysis processing of generating the DL data 61 or not can be performed on the basis of a remaining storage capacity of the DL data 61 and the predetermined set value.

According to an aspect of the preferable embodiment of the present invention, the information with regard to the vacant capacity of the storage section includes a total value of a data capacity of entire intermediate language data generated by the analysis processing and a total value of a data capacity of entire intermediate language data is deleted after being subjected to the rendering processing, and at least any one of the plurality of control sections calculates the storage capacity of the storage section which is used for storing the intermediate language data, based on the total value of the data capacity of entire intermediate language data generated by the analysis processing and the total value of the data capacity of the entire intermediate language data that is deleted after being subjected to the rendering processing, and at least one of the plurality of control sections compares the calculated storage capacity of the storage section which is used for storing the intermediate language data to the predetermined set value.

According to the embodiment, the judgment of whether to discontinue the analysis processing of generating the DL data 61 or not can be performed on the basis of a remaining storage capacity of the DL data 61 to the predetermined set value. Moreover, because the calculation of the DL-use area size is performed only by the core performing the analysis processing of the page corresponding to a page number other than the forefront page number, no interrupt processing is caused in the other cores, and the more throughput of the core can be assigned to the analysis processing thereof.

The present US patent application claims the priority of Japanese Patent Application No. 2010-131624 filed on Jun. 9, 2010 in Japanese Patent Office under the Paris Convention for the Protection of Industrial Property, and the Japanese Patent Application constitutes the basis of amending erroneous transformations in the present US patent application.

What is claimed is:
1. An image processing apparatus, comprising:
a plurality of processor cores, each capable of performing and switching between analysis processing of analyzing data of page description language form to generate intermediate language data and rendering processing of generating rendering data based on the intermediate language data generated by the analysis processing; and
a memory that stores the intermediate language data and the rendering data, wherein
each of the plurality of processor cores performs the analysis processing or the rendering processing in parallel with the analysis processing or the rendering processing performed by the other processor cores,
at least one of the plurality of processor cores performing the analysis processing obtains information with regard to a vacant capacity of the memory, and discontinues the analysis processing and performs the rendering processing based on the information with regard to the vacant capacity of the memory and a predetermined set value,
the data of page description language form includes data of a plurality of pages,
each of the plurality of processor cores performs the analysis processing of a page different from each other,
at least one of the plurality of processor cores performing the analysis processing obtains page numbers of the analysis processing performed by the plurality of processor cores,
if any of the processor cores is performing the analysis processing of a page other than a forefront page number among the obtained page numbers, the processor core performing the analysis processing of the page other than the forefront page number discontinues the analysis processing and performs the rendering processing based on the information with regard to the vacant capacity of the memory and the predetermined set value,
the plurality of processor cores comprises a first processor core corresponding to the processor core that discontinued the analysis processing,
the first processor core performs, after discontinuing the analysis processing, the rendering processing of a first page corresponding to the forefront page number among the obtained page numbers,
the plurality of processor cores further comprises a second processor core corresponding to a processor core that was performing the analysis processing of the first page when the first processor core discontinued the analysis processing, and the first processor core performs the rendering processing of the first page in parallel with the second processor core performing the analysis processing of the first page.

2. The image processing apparatus of claim 1, wherein the information with regard to the vacant capacity of the memory includes information with regard to a storage capacity of the memory used for storing the intermediate language data, and the predetermined set value indicates a threshold value of a storage capacity of the memory to be assigned for storing the intermediate language data.

3. The image processing apparatus of claim 2, wherein the information with regard to the vacant capacity of the memory includes a total value of a data capacity of entire intermediate language data generated by the analysis processing and a total value of a data capacity of entire intermediate language data that is deleted after being subjected to the rendering processing, and at least one of the plurality of processor cores performing the analysis processing calculates the storage capacity of the memory used for storing the intermediate language data, based on the total value of the data capacity of entire intermediate language data generated by the analysis processing and the total value of the data capacity of the entire intermediate language data that is deleted after being subjected to the rendering processing, and compares the calculated storage capacity of the memory used for storing the intermediate language data to the predetermined set value.

4. The image processing apparatus of claim 1, wherein after the first processor core completes the rendering processing of the intermediate language data stored in the memory by the second processor core performing the analysis processing of the first page, the first processor core resumes the analysis processing of a second page that was being performed at the time the analysis processing was discontinued, the second page corresponding to a page other than the forefront page number, and the first processor core performs the analysis processing of the second page in parallel with the second processor core performing the analysis processing of the first page.

5. The image processing apparatus of claim 4, wherein after the second processor core completes the analysis processing of the first page, the second processor core performs the rendering processing of the first page, and the first processor core discontinues the analysis processing of the second page and performs the rendering processing of the first page in parallel with the second processor performing the rendering processing of the first page.

6. An image processing method, comprising:

performing, using a plurality of processor cores, analysis processing of analyzing data of page description language form to generate intermediate language data and rendering processing of generating rendering data based on the intermediate language data generated by the analysis processing, wherein each of the processor cores is capable of performing and switching between the analysis processing and the rendering processing, and performs the analysis processing or the rendering processing in parallel with the analysis processing or the rendering processing performed by the other processor cores;

storing the intermediate language data and the rendering data in a memory;

obtaining information with regard to a vacant capacity of the memory by at least one of the plurality of processor cores performing the analysis processing;

discontinuing the analysis processing being performed by the at least one processor core and performing the rendering processing with the at least one processor core based on the information with regard to the vacant capacity of the memory and a predetermined set value, wherein the data of page description language form includes data of a plurality of pages, each of the plurality of processor cores performs the analysis processing of a page different from each other, at least one of the plurality of processor cores performing the analysis processing obtains page numbers of the analysis processing performed by the plurality of processor cores, and if any of the processor cores is performing the analysis processing of a page other than a forefront page number among the obtained page numbers, the processor core performing the analysis processing of the page other than the forefront page number discontinues the analysis processing and performs the rendering processing based on the information with regard to the vacant capacity of the memory and the predetermined set value, the plurality of processor cores comprises a first processor core corresponding to the processor core that discontinued the analysis processing, the first processor core performs, after discontinuing the analysis processing, the rendering processing of a first page corresponding to the forefront page number among the obtained page numbers, the plurality of processor cores further comprises a second processor core corresponding to a processor core that was performing the analysis processing of the first page when the first processor core discontinued the analysis processing, and the first processor core performs the rendering processing of the first page in parallel with the second processor core performing the analysis processing of the first page.

7. A non-transitory computer-readable storage medium storing a program comprising instructions for making a computer execute the method of claim 6.

8. The non-transitory computer-readable storage medium of claim 7, wherein the information with regard to the vacant capacity of the memory includes information with regard to a storage capacity of the memory used for storing the intermediate language data, and the predetermined set value indicates a threshold value of a storage capacity of the memory to be assigned for storing the intermediate language data.

9. The non-transitory computer-readable storage medium of claim 8, wherein the information with regard to the vacant capacity of the memory includes a total value of a data capacity of entire intermediate language data generated by the analysis processing and a total value of a data capacity of entire intermediate language data that is deleted after being subjected to the rendering processing, and at least one of the plurality of processor cores performing the analysis processing calculates the storage capacity of the memory used for storing the intermediate language data, based on the total value of the data capacity of entire intermediate language data generated by the analysis processing and the total value of the data capacity of the entire intermediate language data that is deleted after being subjected to the rendering processing, and compares the calculated storage capacity of the memory used for storing the intermediate language data to the predetermined set value.

10. The non-transitory computer-readable storage medium of claim 7, wherein
after the first processor core completes the rendering processing of the intermediate language data stored in the memory by the second processor core performing the analysis processing of the first page, the first processor core resumes the analysis processing of a second page that was being performed at the time the analysis processing was discontinued, the second page corresponding to a page other than the forefront page number, and
the first processor core performs the analysis processing of the second page in parallel with the second processor core performing the analysis processing of the first page.

11. The non-transitory computer-readable storage medium of claim 10, wherein
after the second processor core completes the analysis processing of the first page, the second processor core performs the rendering processing of the first page, and the first processor core discontinues the analysis processing of the second page and performs the rendering processing of the first page in parallel with the second processor performing the rendering processing of the first page.

12. The image processing method of claim 6, wherein
the information with regard to the vacant capacity of the memory includes information with regard to a storage capacity of the memory used for storing the intermediate language data, and
the predetermined set value indicates a threshold value of a storage capacity of the memory to be assigned for storing the intermediate language data.

13. The image processing method of claim 12, wherein
the information with regard to the vacant capacity of the memory includes a total value of a data capacity of entire intermediate language data generated by the analysis processing and a total value of a data capacity of entire intermediate language data that is deleted after being subjected to the rendering processing, and
at least one of the plurality of processor cores performing the analysis processing calculates the storage capacity of the memory used for storing the intermediate language data, based on the total value of the data capacity of entire intermediate language data generated by the analysis processing and the total value of the data capacity of the entire intermediate language data that is deleted after being subjected to the rendering processing, and compares the calculated storage capacity of the memory used for storing the intermediate language data to the predetermined set value.

14. The image processing method of claim 6, wherein
after the first processor core completes the rendering processing of the intermediate language data stored in the memory by the second processor core performing the analysis processing of the first page, the first processor core resumes the analysis processing of a second page that was being performed at the time the analysis processing was discontinued, the second page corresponding to a page other than the forefront page number, and
the first processor core performs the analysis processing of the second page in parallel with the second processor core performing the analysis processing of the first page.

15. The image processing method of claim 14, wherein
after the second processor core completes the analysis processing of the first page, the second processor core performs the rendering processing of the first page, and the first processor core discontinues the analysis processing of the second page and performs the rendering processing of the first page in parallel with the second processor performing the rendering processing of the first page.

* * * * *